US005379877A

United States Patent [19]

Hoefling

[11] Patent Number: 5,379,877

[45] Date of Patent: Jan. 10, 1995

[54] HANDRAIL DRIVE FOR ESCALATORS, MOVING SIDEWALKS OR THE LIKE

[75] Inventor: Peter Hoefling, Dortmund, Germany

[73] Assignee: O&K Orenstein & Koppel AG, Berlin, Germany

[21] Appl. No.: 137,038

[22] PCT Filed: Jan. 28, 1993

[86] PCT No.: PCT/EP93/00190

§ 371 Date: Oct. 18, 1993

§ 102(e) Date: Oct. 18, 1993

[87] PCT Pub. No.: WO93/15015

PCT Pub. Date: Aug. 5, 1993

[30] Foreign Application Priority Data

Jan. 29, 1992 [DE] Germany .............................. 4202346
Jan. 21, 1993 [DE] Germany .............................. 4301512

[51] Int. Cl.$^6$ .............................................. B65G 21/00
[52] U.S. Cl. ...................................... 198/330; 198/331
[58] Field of Search ................................ 198/330, 331

[56] References Cited

U.S. PATENT DOCUMENTS 4,775,044 10/1988 Hoefling .............................. 198/330

FOREIGN PATENT DOCUMENTS

| | | | |
|---|---|---|---|
| 340822 | 4/1977 | Austria . | |
| 1249299 | 11/1960 | France . | |
| 874206 | 9/1952 | Germany . | |
| 957342 | 8/1956 | Germany . | |
| 1506480 | 10/1969 | Germany . | |
| 3526905C2 | 2/1987 | Germany . | |
| 7505176 | 11/1975 | Netherlands | 198/331 |
| 335283 | 2/1959 | Switzerland . | |
| 1530558 | 12/1989 | U.S.S.R. | 198/330 |

OTHER PUBLICATIONS

Soviet Inventions Illustrated, Section Q38, week 8711, Apr. 29, 1987; Derwent Publications Ltd., London; SU-1245 537 A (Grokhovskiid V).

*Primary Examiner*—Cheryl L. Gastineau
*Attorney, Agent, or Firm*—Spencer, Frank & Schneider

[57] ABSTRACT

A handrail drive located at a reversal region of a handrail. The handwheel drive has a motor-gear assembly including an electric motor and a multistage planet gear assembly. The handwheel drive further includes a handrail wheel having a drive region connected with the motor-gear assembly. The drive region and the motor-gear assembly are co-axially located.

15 Claims, 2 Drawing Sheets

HANDRAIL DRIVE FOR ESCALATORS, MOVING SIDEWALKS OR THE LIKE

BACKGROUND OF THE INVENTION

The invention relates to a handrail drive for escalators, moving sidewalks or similar people movers.

German Auslegeschrift (published examined patent application); 1,506,480 discloses a handrail drive for escalators and the like which includes a handrail drive wheel that is partially enclosed by the handrail, is driven by a stepped chain wheel and is disposed between the two reversal wheels of the handrail. The handrail is urged against the handrail drive wheel by a belt. The handrail drive wheel is coaxially connected in a known manner with the stepped chain wheel so as to rotate together with it. The stepped chain engages the circumferential region of the stepped chain wheel where it faces away from the pressure belt. The drawback of this prior art device is essentially that the same requires a relatively large amount of space as well as a large number of reversal elements for the handrail.

SUMMARY OF THE INVENTION

It is an object of the invention to provide a handrail drive which is of relatively simple construction and requires very little space.

This is accomplished by a handrail drive for escalators, moving sidewalks or similar people movers provided in at least one reversal region of the handrail. The handrail drive includes a handrail wheel that cooperates with a drive region, with the drive region being connected with a motor-gear-assembly combination that is provided coaxially therewith.

By using a multistage planet gear assembly, the handrail drive is of a relatively short coaxial construction and can easily be provided in the region of the balustrade head without interfering with the space of other components such as the stepped drive.

In order to reduce the noise, the first stage of the planet gear assembly is preferably provided with helical gears while the subsequent stages are configured to be spur toothed. Due to the fact that at least parts of the planet gear assembly are provided already within the spatial expanse of the handrail, the structural space required can be reduced again. The structure is configured for optimum function, with gear assembly and motor, preferably an electric motor, forming a structural unit. Due to the handrail drive acting directly onto the handrail wheel, substantial changes of direction or drive elements become unnecessary in the region of the transporting path.

BRIEF DESCRIPTION OF THE DRAWINGS

One embodiment of the invention will be described as follows and is illustrated in the drawing, in which.

DETAILED DESCRIPTION OF THE PREFERRED EMBODIMENT

Figure 2:
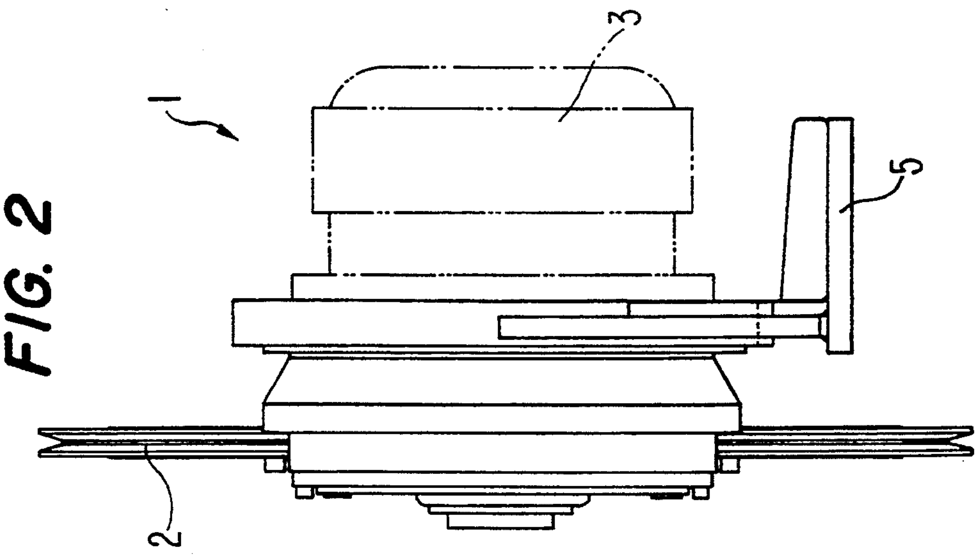
FIGS. 1 and 2—depict a handrail wheel with flanged-on drive.
Figure 1:
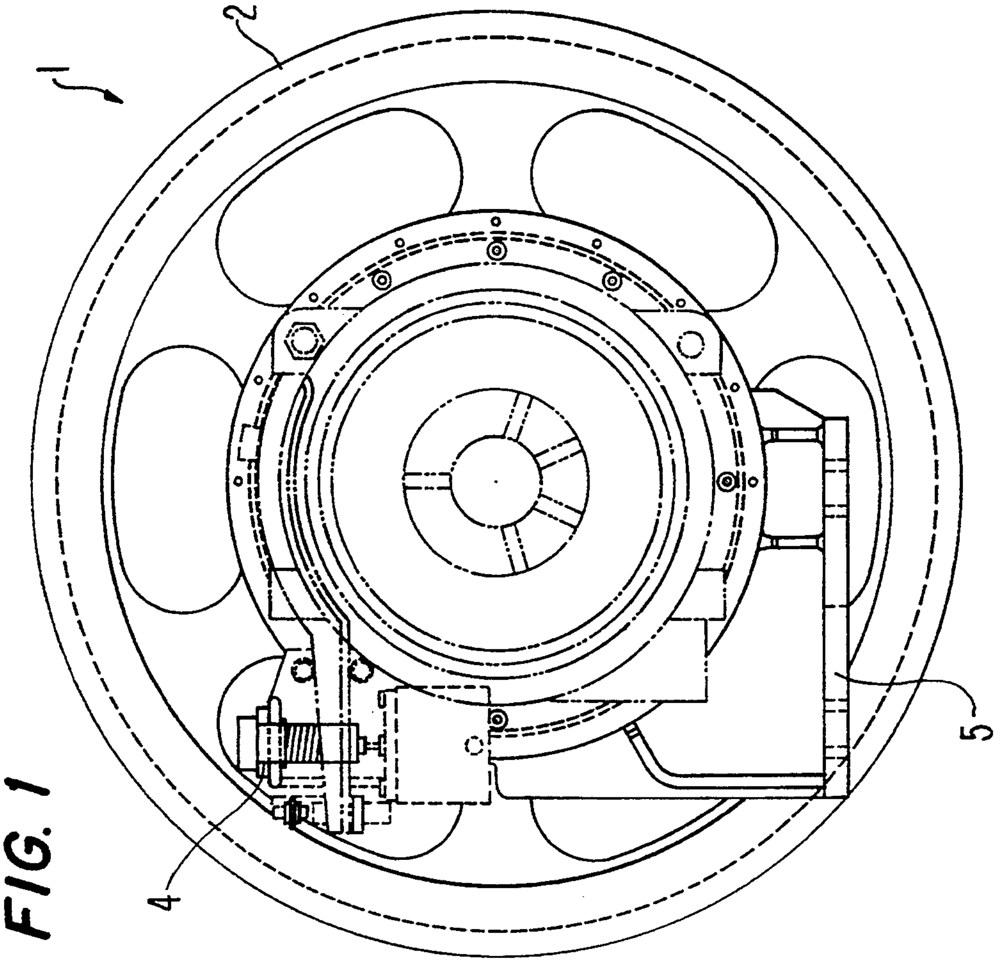

FIGS. 1 and 2 depict in different views the handrail drive 1 according to the invention, with essentially the following components being shown here:

a handrail wheel 2, an electric motor 3, a motor brake 4, a console (angular bracket) 5 for supporting the handrail drive in the upper balustrade region not shown here in detail, for example, of an escalator.

Figure 3:
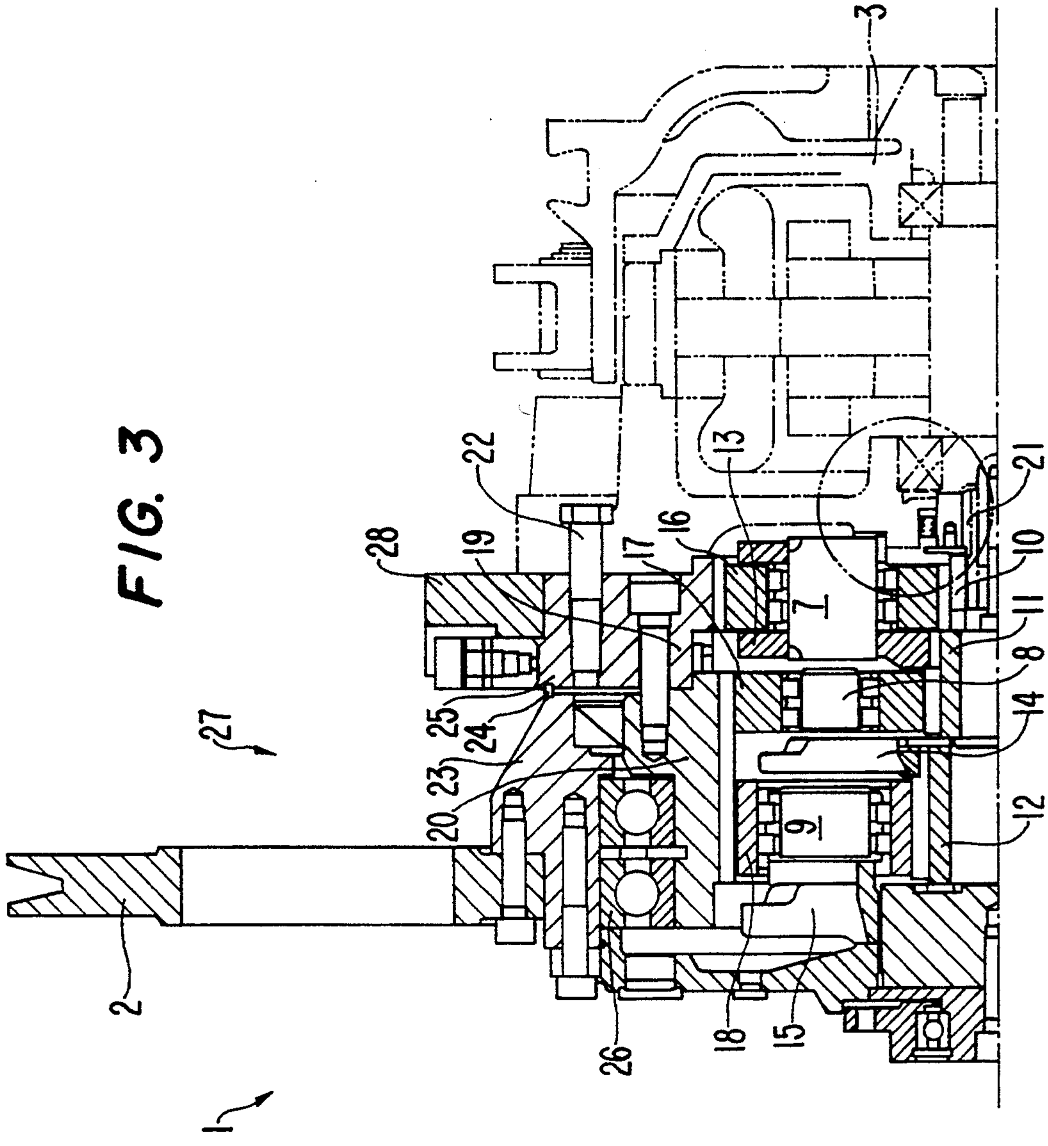
FIG. 3—is a cross-sectional view of the handrail wheel and its drive.

FIG. 3 is a cross-sectional view of the handrail drive 1. The combination of electric motor 3 and planet gear assembly 6 is connected with the drive region 27 of handrail wheel 2 to form a drive unit. The planet gear assembly 6 has three stages 7, 8, 9, with the first stage 7 being provided with helical gears and the subsequent stages 8 and 9 with spur gears. Each stage 7, 8, 9 is formed of pinions 10, 11, 12, planet wheels 16, 17, 18 guided in pinion cages 13, 14, 15 as well as a hollow wheel (sun wheel) composed of two individual wheels 19, 20. The output shaft 21 of electric motor 3 is provided with teeth and meshes with the pinion 10 of the first stage 7. The individual wheel 19 here cooperates with the first stage 7, while the individual wheel 20 is made longer axially and meshes with the planet wheels 17, 18 of the next following stages 8 and 9. Individual wheel 19 is provided with a radially outwardly oriented flange 28 to which electric motor 3 is fastened by means of screws 22. In the region of handrail wheel 2, an axially extending sleeve-shaped attachment 23 is provided which axially grips over individual wheel 20 while its free end 24 engages in a circumferential groove 25 of radial flange 28 so as to form a labyrinth seal. Radially above the third stage 9 of planet gear assembly 6, a roller bearing 26 is provided between attachment 23 and individual wheel 20.

I claim:

1. A handrail drive located at a reversal region of a driven handrail of a people mover system, comprising:
   - a motor-gear assembly including an electric motor and a multistage planet gear assembly; and
   - a handrail wheel having a drive region connected with said motor-gear assembly, said drive region and said motor-gear assembly being co-axially located.

2. A handrail drive as defined in claim 1, wherein a first stage of said planet gear assembly comprises a helical gear.

3. A handrail drive as defined in claim 1, wherein a stage subsequent to a first stage of said planet gear assembly comprises a spur gear.

4. A handrail drive as defined in claim 1, wherein said planet gear assembly comprises a non-rotating hollow sun wheel, and each stage of said planet gear assembly includes a pinion and a planet wheel guided in a respective pinion cage, said planet wheel meshingly engaging with said hollow sun wheel.

5. A handrail drive as defined in claim 4, wherein said hollow sun wheel has two individual wheels fixedly connected with one another.

6. A handrail drive as defined in claims 5, wherein said planet wheel of a first stage meshingly engage with the one individual wheel and said planet wheel of a subsequent stage mesh with the other individual wheel.

7. A handrail drive as defined in claim 6, wherein said one individual wheel includes a radially outwardly extending flange.

8. A handrail drive as defined in claim 7, wherein said handrail wheel includes a sleeve-shaped attachment radially outside of said sun wheel and extending axially over the stages subsequent to the first stage in a direction towards said flange.

9. A handrail drive as defined in claim 8, wherein said sleeve-shaped attachment has a free end, and said flange has an end face having a circumferential groove facing said sleeve-shaped attachment, said free end being guided into said circumferential groove to form a labyrinth seal.

10. A handrail drive as defined in claim 8, further comprising a roller bearing radially located between one said individual wheel and said sleeve-shaped attachment.

11. A handrail drive as defined in claim 10, wherein said planet gear assembly has three stages, said roller bearing being located in a region of the third stage.

12. A handrail drive as defined in claim 7, wherein said electric motor is fastened to said radially outwardly extending flange.

13. A handrail drive as defined in claim 4, wherein said electric motor has a toothed output shaft connected with said pinion of a first stage of the planet gear assembly.

14. A handrail drive as defined in claim 1, the handrail including a balustrade head, said motor-gear assembly being located in a region of the balustrade head.

15. A handrail drive as defined in claim 7, wherein said radially outwardly extending flange includes an angular bracket for displacing said motor-gear assembly.

* * * * *